United States Patent [19]

Wysocki

[11] Patent Number: 5,396,979
[45] Date of Patent: Mar. 14, 1995

[54] APPARATUS FOR ORIENTING CAP ASSEMBLIES

[75] Inventor: Kazmier Wysocki, Hackensack, N.J.

[73] Assignee: PMC Industries, Hackensack, N.J.

[21] Appl. No.: 250,714

[22] Filed: May 27, 1994

[51] Int. Cl.6 ............................................. B65G 47/24
[52] U.S. Cl. .................................... 198/392; 198/394; 198/400
[58] Field of Search ............... 198/382, 383, 390, 392, 198/394, 400, 411

[56] References Cited

U.S. PATENT DOCUMENTS

| | | | |
|---|---|---|---|
| 3,874,498 | 4/1975 | Cover et al. | 198/400 |
| 3,876,064 | 4/1975 | Morton | 198/400 X |
| 4,208,761 | 6/1980 | Ionescu | 198/399 X |
| 4,225,031 | 9/1980 | Frisbie et al. | 198/395 |
| 4,306,647 | 12/1981 | Boucherie | 198/379 |
| 4,463,846 | 8/1984 | Ionescu | 198/399 |
| 4,610,345 | 9/1986 | Spreen et al. | 198/392 |
| 4,779,714 | 10/1988 | Madden | 198/399 |
| 5,197,584 | 3/1993 | Powell et al. | 198/380 |

*Primary Examiner*—James R. Bidwell
*Attorney, Agent, or Firm*—Samuelson & Jacob

[57] ABSTRACT

Apparatus for orienting cap assemblies presented serially in a stream of random oriented cap assemblies, each cap assembly having a span between a leading edge and a trailing edge and an axis located intermediate the leading and trailing edges, the apparatus including a gate having opposite abutments spaced relative to the span and the axis of each cap assembly, and a rotor for advancing the cap assemblies through the gate such that a selected one of the leading edge and the trailing edge of each cap assembly will engage one of the opposite abutments as the cap assembly passes through the gate to turn the cap assembly into the desired orientation for delivery of a stream of uniformly oriented cap assemblies.

10 Claims, 4 Drawing Sheets

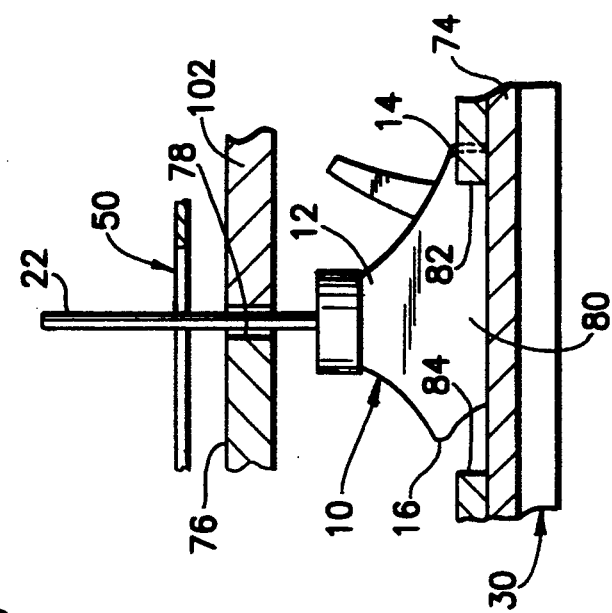
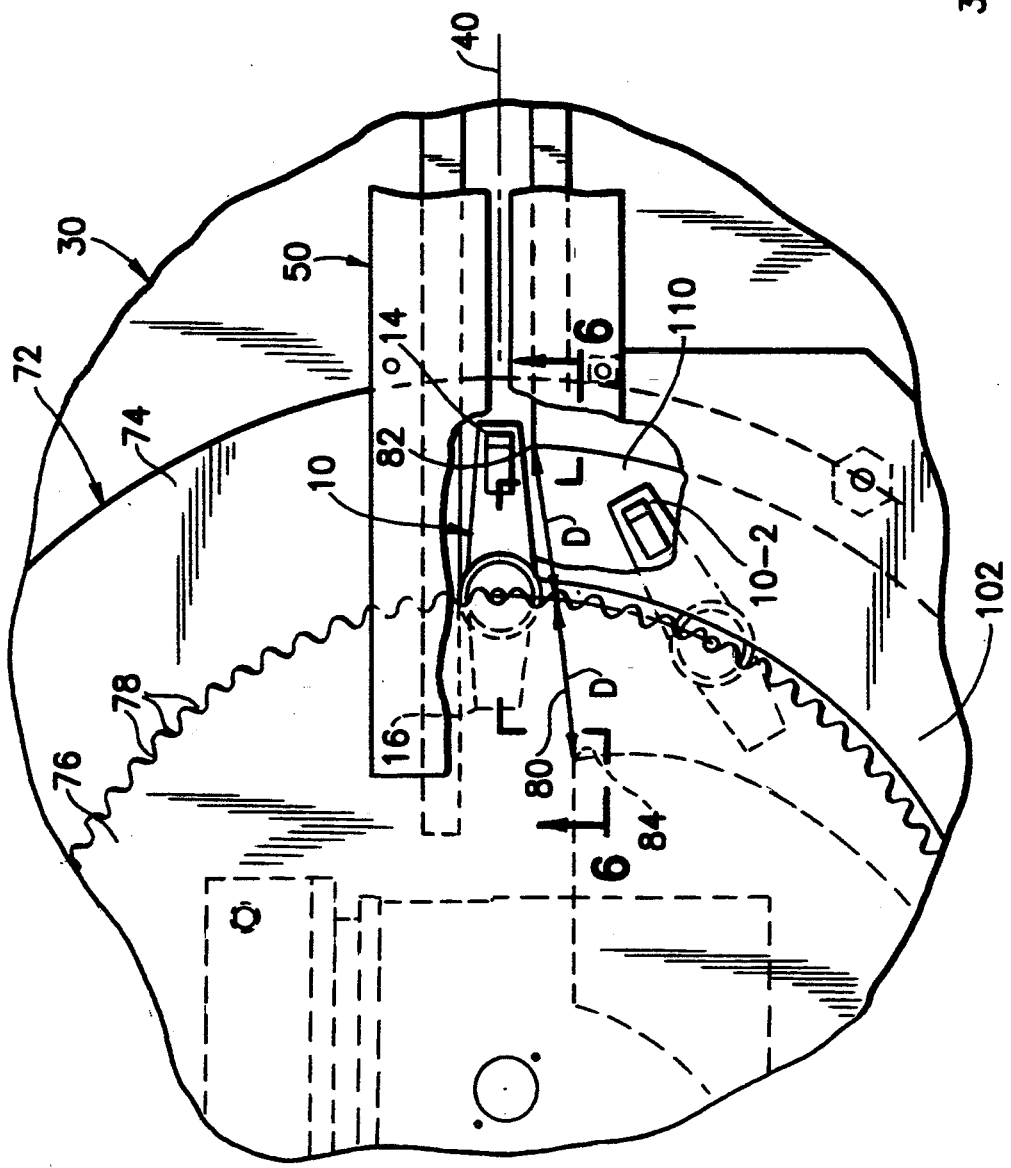

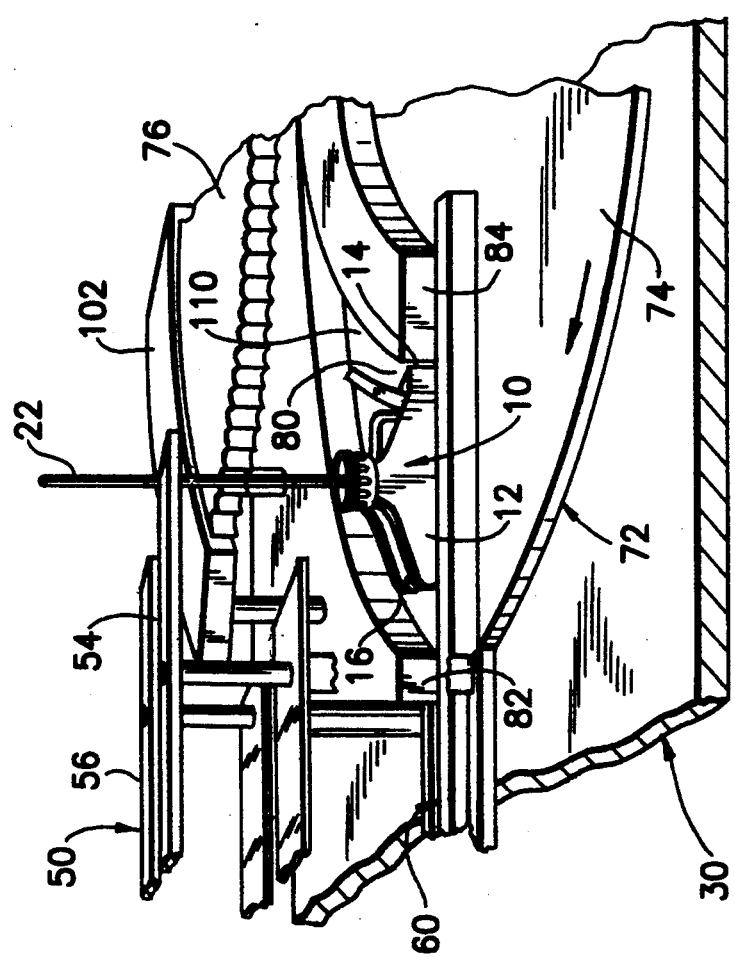
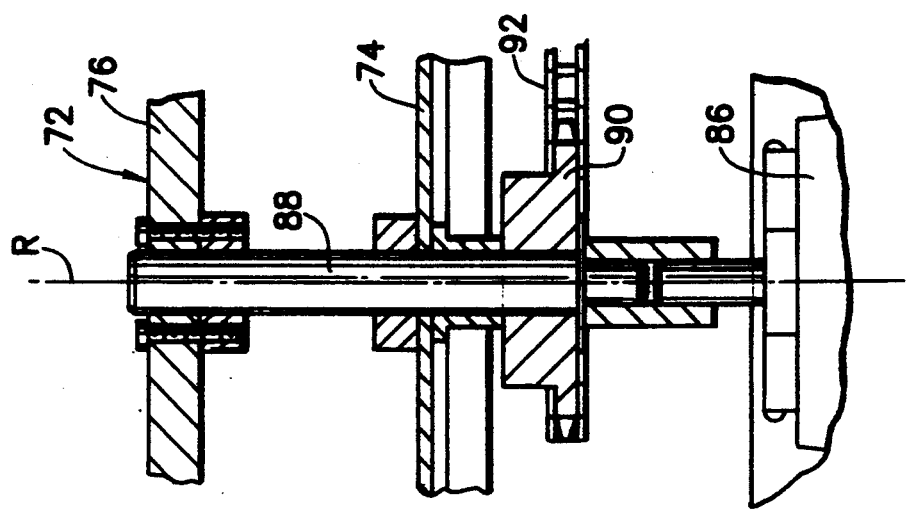

APPARATUS FOR ORIENTING CAP ASSEMBLIES

The present invention relates generally to apparatus for capping filled containers and pertains, more specifically, to apparatus for orienting serially presented cap assemblies for capping operations.

Mechanized filling and capping of containers has reached a highly developed state. The increasing numbers of containers which must be filled and capped each year has led to the requirement for more rapid and efficient procedures and machines in order to keep pace with the demand. In addition to the large number of such operations, the configuration and construction of caps and containers continually are undergoing changes dictated by function and materials, as well as by aesthetic considerations, and such changes have required concomitant developments in the methods and apparatus for handing the caps and containers.

More particularly, the increased popularity of manually operated pump cap assemblies has brought about a need for handling these cap assemblies in greater numbers and with increased efficiency. Many of the pump cap assemblies currently in use are constructed largely of molded synthetic polymeric components and are designed in a variety of shapes and sizes. These factors raise problems in handling the cap assemblies when it becomes necessary to deliver the cap assemblies serially, in rapid succession, appropriately aligned and oriented for capping operations.

An orienter for trigger pump cap assemblies is disclosed in U.S. Pat. No. 4,779,714. In that arrangement, the orienter utilizes the presence of an altitudinally projecting trigger to assist in attaining the appropriate orientation of each cap assembly in a stream of serially presented cap assemblies.

The present invention provides orienting apparatus for accepting cap assemblies presented serially, in random front-to-back orientation, and for delivering the cap assemblies in a desired uniform front-to-back orientation for further capping operations, the apparatus relying upon characteristics of the cap assemblies other than the presence of a trigger. As such, the present invention attains several objects and advantages, some of which are summarized as follows: Enables effective handling of the cap assemblies so as to facilitate the delivery of the cap assemblies serially, in rapid succession, appropriately aligned and oriented front-to-back for capping operations; provides suitability for use with the particular configurations and materials utilized in current cap assemblies, while being adaptable readily to a variety of proposed designs; enables the orienting of cap assemblies with increased rapidity and efficiency, utilizing available characteristics of the cap assemblies themselves as a basis for manipulating the cap assemblies; operates with reduced incidents of jamming and consequent interruption of the supply of correctly oriented cap assemblies; enables orientation of cap assemblies having configurations heretofore difficult to orient with sufficient rapidity to render practical the mechanized handling of such cap assemblies; provides compactness in design and layout to minimize production space requirements; provides simplicity in construction, including a reduction in the number of moving parts, leading to reduced costs in production and in maintenance of capping machinery; enables the successful handling of a wider variety of cap assembly configurations, thereby encouraging the design and development of further innovative cap assemblies.

The above objects and advantages, as well as further objects and advantages, are attained by the present invention which may be described briefly as apparatus for orienting cap assemblies as the cap assemblies are advanced along a path of travel from an input toward an output for subsequent assembly with corresponding bottles in a selected orientation relative to the bottles, each cap assembly including a span between a leading edge and a trailing edge, and an axis transverse to the direction of advancement of the cap assemblies, the leading edge being spaced longitudinally a first distance from the axis and the trailing edge being spaced longitudinally a second distance from the axis, the second distance being greater than the first distance, the apparatus comprising: a gate including opposite abutments defining an opening; input means for bringing the cap assemblies serially to the gate with each cap assembly placed such that the span of the cap assembly at the gate extends across the opening of the gate, with the leading edge juxtaposed with one of the opposite abutments and the trailing edge juxtaposed with the other of the opposite abutments; advancement means for advancing each cap assembly through the gate, the advancement means including coupling means for coupling each cap assembly for movement transverse to the axis through the gate and for rotation about the axis as the cap assembly is advanced transverse to the axis through the gate, with the axis following a path spaced from each of the opposite abutments a distance greater than said first distance and less than said second distance so that as each cap assembly is advanced through the gate, the trailing edge of the cap assembly will engage one of the opposite abutments while the leading edge will clear the other of the opposite abutments and the cap assembly will turn about the axis to be oriented with the trailing edge located behind the leading edge as the cap assembly emerges from the gate; and output means for receiving the cap assemblies serially from the gate in a stream of cap assemblies oriented uniformly with the trailing edges located behind the leading edges for advancement to the bottles in the selected orientation.

The invention will be understood more fully, while still further objects and advantages will become apparent, in the following detailed description of a preferred embodiment of the invention illustrated in the accompanying drawing, in which:

FIG. 5 is a plan view similar to FIG. 3, but showing the orientation of another cap assembly at the orienting station;

FIG. 6 is a cross-sectional view similar to FIG. 4, but taken along line 6—6 of FIG. 5;

FIG. 7 is a fragmentary elevational cross-sectional view taken along line 7—7 of FIG. 2; and FIG. 8 is a pictorial perspective view taken in the direction of the arrow in FIG. 3.

Figure 1:
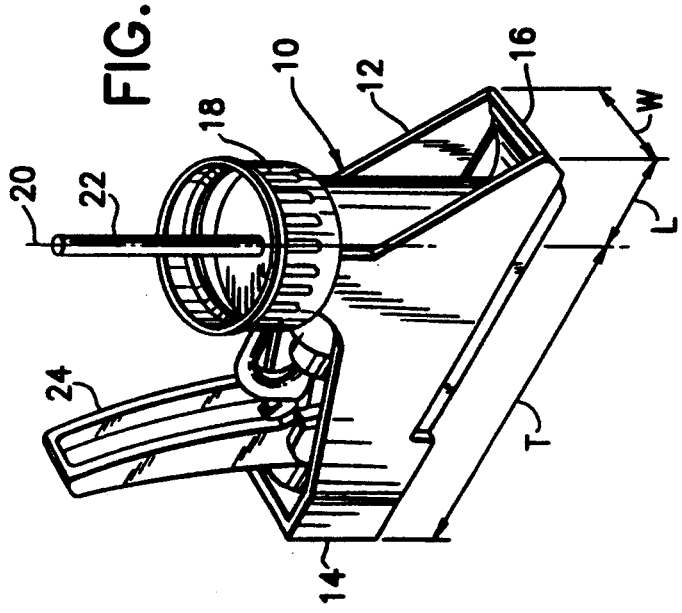
FIG. 1 is a perspective view of a cap assembly to be oriented utilizing the apparatus of the present invention.

Referring now to the drawing, and especially to FIG. 1 thereof, a cap assembly of the type to be oriented by the apparatus of the present invention is shown at 10. Cap assembly 10 includes a pump housing 12 which has a predetermined width W and extends longitudinally along a span between a back, or trailing edge 14, and a front, or leading edge 16. A cap 18 is located intermediate the trailing edge 14 and the leading edge 16 and is rotatable, relative to the pump housing 12, about an axis 20 so as to enable cap 18 to be screwed onto a complementary threaded neck of a bottle (not shown) to be closed with cap assembly 10 while pump housing 12 remains stationary. A dip tube 22 extends along axis 20 and will be inserted into the bottle. A trigger 24 projects from the pump housing 12, generally parallel to the direction of axis 20, and the cap 18. The trailing edge 14 is located at a longitudinal distance T from the axis 20, while the leading edge 16 is located at a longitudinal distance L from the axis 20, the distance T being greater than the distance L, and the sum of the distances T and L being essentially equal to the span between the trailing edge 14 and the leading edge 16.

Figure 2:
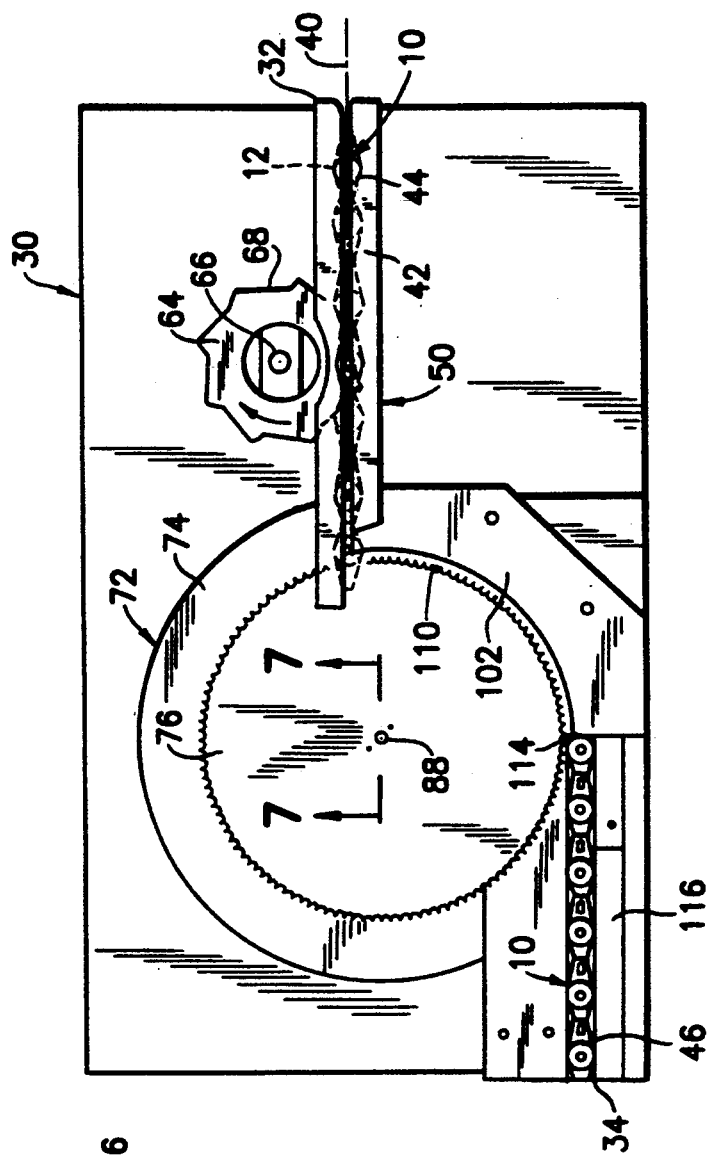
FIG. 2 is a top plan view of an apparatus constructed in accordance with the present invention.
Figure 4:
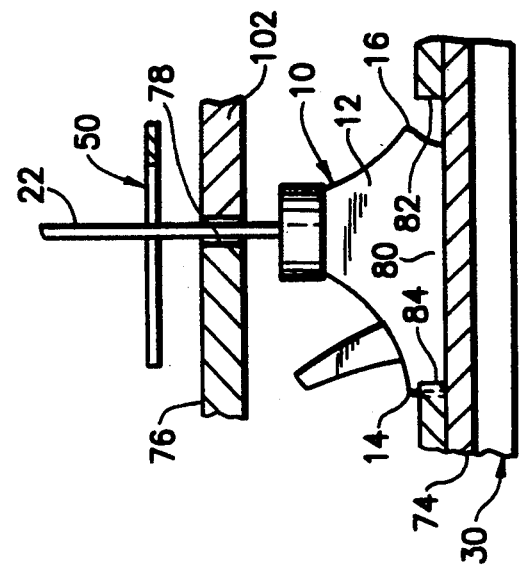
FIG. 4 is a fragmentary elevational cross-sectional view taken along line 4—4 of FIG. 3.

Turning now to FIG. 2, an apparatus constructed in accordance with the present invention is shown at 30 and is seen receiving cap assemblies 10 presented serially in random front-to-back orientation at an input end 32 of the apparatus 30 and delivering the cap assemblies at a discharge end 34, each in the desired uniform orientation. Thus, cap assemblies 10 travel along a path of travel 40 with the pump housing 12 aligned longitudinally along the path of travel 40 and arrive at input end 32 in either one of two orientations, namely, with the trailing edge 14 trailing the leading edge 16, as seen at 42, or with the trailing edge 14 leading the leading edge 16, as seen at 44. Upon delivery of the cap assemblies 10 at the discharge end 34, all of the cap assemblies 10 are oriented in the desired orientation, which is the first of the above-described orientations, with the trailing edge 14 trailing the leading edge 16, as seen at 46. In order to facilitate travel of the cap assemblies 10 along the path of travel 40 through apparatus 30, the apparatus 30 preferably is tilted so that input end 32 is higher than discharge end 34, enabling the force of gravity to assist in moving the cap assemblies 10 along the path of travel 40. However, a variety of alternate conveying arrangements is available for moving cap assemblies 10 along the path of travel 40, independent of gravity. The uniformly oriented cap assemblies 10 then travel on to be united with the bottles.

Turning now to FIGS. 3 through 8, as well as to FIG. 2, apparatus 30 accomplishes uniform orientation of the serially presented cap assemblies 10, as follows. As the cap assemblies 10 travel longitudinally along path of travel 40, the cap assemblies 10 enter input means, shown in the form of an input track 50, with the pump housing 12 of each cap assembly 10 supported on a base plate 52 and the dip tube 22 projecting altitudinally, in this instance upwardly, and guided for movement in a direction transverse to axis 20 along the path of travel 40 by a guide channel 54 which includes a guide rail 56 at either side of the path of travel 40. A second pair of guide rails 58 is located altitudinally below the first guide rails 56 and establishes a second guide channel 60 for guiding the pump housings 12 as the cap assemblies 10 move along the path of travel 40. A metering star wheel 64 is rotated about a generally vertical shaft 66 and includes a pocketed periphery 68 which intercepts the path of travel 40 to meter the serially traveling cap assemblies 10, in a now well-known manner, as the cap assemblies 10 travel downstream along the path of travel 40.

Further downstream, each cap assembly 10 is located at an orienting station in a position along a segment 70 of the path of travel 40, at which position the cap assembly 10 is placed upon a rotor 72 having a lower disk 74 and an upper disk 76. The so-placed cap assembly 10 rests upon the lower disk 74 while the dip tube 22 of the cap assembly 10 is received within one of a plurality of pockets 78 spaced along the periphery of the upper disk 76, each pocket 78 being generally complementary to the dip tube 22, so as to couple each cap assembly 10 for transverse movement essentially normal to axis 20. The rotor 72 rotates in the clockwise direction, as viewed in FIGS. 3 and 5, so as to comprise advancement means for carrying the cap assembly 10 in the direction of the arrow 79. Segment 70 of path of travel 40 is juxtaposed with a gate 80 established by opposite abutments including a near abutment 82 and a far abutment 84, both of which abutments 82 and 84 are stationary and spaced apart in the longitudinal direction generally parallel to the segment 70. As best seen in FIG. 7, rotor 72 is mounted for rotation about an axis of rotation R which is generally transverse to gate 80 and essentially parallel to axis 20. A drive motor 86 rotates a drive shaft 88 which carries rotor 72 and which is coupled with metering star wheel 64, through a sprocket 90 and drive chain 92. The periphery of the upper disk 76 places the pockets 78 along an arcuate path 100 intermediate the abutments 82 and 84. At the gate 80, the path 100 is spaced from each abutment 82 and 84 a distance D which is greater than the distance L between the axis 20 of the cap assembly 10 and the leading edge 16, and which is less than the distance T between the axis 20 and the trailing edge 14 of the cap assembly 10.

Figure 3:
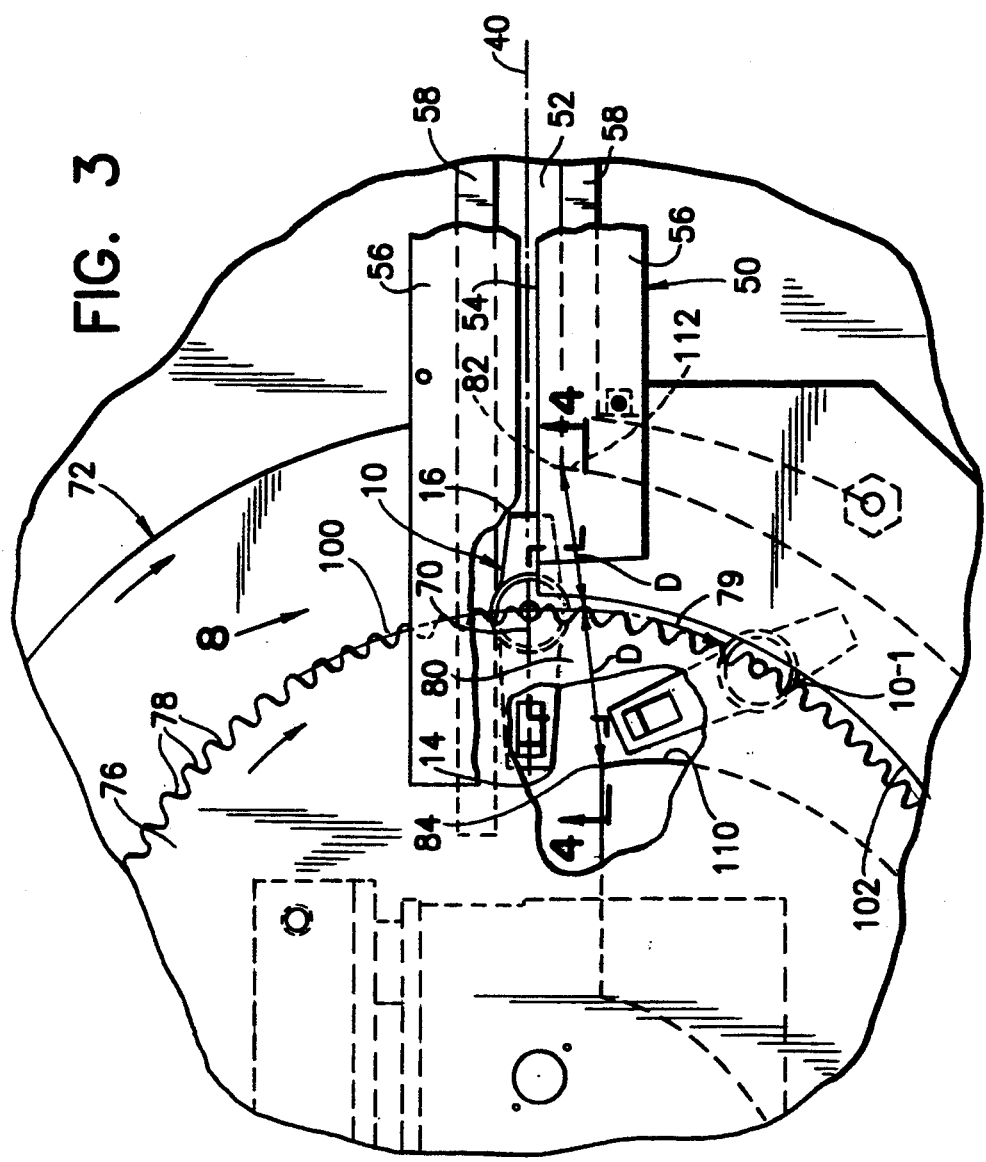
FIG. 3 is an enlarged fragmentary plan view of a portion of the apparatus showing the orientation of a cap assembly at an orienting station.

Thus, when a cap assembly 10 arrives at segment 70 with the trailing edge 14 ahead of the leading edge 16, as seen in FIG. 3, rotor 72 will move the cap assembly 10 through the gate 80, with the dip tube 22 captured within a pocket 78, and retained in the pocket 78 by an arcuate guide bar 102, to follow arcuate path 100. Since the distance D between the arcuate path 100 and the far abutment 84 is less than the distance T, the trailing edge 14 of the cap assembly 10 will engage the far abutment 84 of gate 80, tending to turn the cap assembly 10 in a clockwise direction about axis 20, such rotation being permitted by the fact that the distance D between the arcuate path 100 and the near abutment 82 is greater than distance L, allowing the leading edge 16 to clear the near abutment 82. Hence, as the rotor 72 moves the cap assembly 10 into output means in the form of an output track 110, which is immediately downstream of gate 80, the cap assembly 10 is oriented in the desired orientation wherein the trailing edge 14 trails the leading edge 16, as seen at 10-1.

When a cap assembly 10 arrives at segment 70 with the trailing edge 14 behind the leading edge 16, as seen in FIG. 5, rotor 72 will move the cap assembly 10 through the gate 80, with the dip tube 22 captured within a pocket 78, and retained in the pocket 78 by arcuate guide bar 102, to follow arcuate path 100. Since the distance D between the arcuate path 100 and the near abutment 82 is less than the distance T, the trailing edge 14 of the cap assembly 10 will engage the near abutment 82 of gate 80, tending to turn the cap assembly 10 in a counterclockwise direction about axis 20, such rotation being permitted by the fact that the distance D between the arcuate path 100 and the far abutment 84 is greater than distance L, allowing the leading edge 16 to clear the far abutment 84. Hence, as the rotor 72 moves the cap assembly 10 into the output track 110, immediately downstream of gate 80, the cap assembly 10 is oriented in the desired orientation wherein the trailing edge 14 trails the leading edge 16, as seen at 10-2.

The width of the output track 110 is tapered from an inlet end 112, where the output track 110 has a width corresponding to the opening between the abutments 82 and 84 of the gate 80, to an outlet end 114 (see FIG. 2), where the output track 110 has a width corresponding generally to the width W of the pump housing 12 of the cap assembly 10 so as to deliver a stable stream of cap assemblies 10 to a discharge chute 116 leading to discharge end 34.

It will be seen that apparatus 30 accepts serially presented cap assemblies 10 in random orientation and delivers the cap assemblies 10 in the desired uniform orientation with ease and simplicity. The above-described operation is reliable and the arrangement of component parts is adapted readily to cap assemblies having a variety of configurations, utilizing features and configurations inherent in the design of the cap assemblies for accomplishing the desired orientation.

It is to be understood that the above detailed description of a preferred embodiment of the invention is provided by way of example only. Various details of design and construction may be modified without departing from the true spirit and scope of the invention, as set forth in the appended claims.

The embodiments of the invention in which an exclusive property or privilege is claimed are defined as follows:

1. Apparatus for orienting cap assemblies as the cap assemblies are advanced along a path of travel from an input toward an output for subsequent assembly with corresponding bottles in a selected orientation relative to the bottles, each cap assembly including a span between a leading edge and a trailing edge, and an axis transverse to the direction of advancement of the cap assemblies, the leading edge being spaced longitudinally a first distance from the axis and the trailing edge being spaced longitudinally a second distance from the axis, the second distance being greater than the first distance, the apparatus comprising:

a gate including opposite abutments defining an opening;

input means for bringing the cap assemblies serially to the gate with each cap assembly placed such that the span of the cap assembly at the gate extends across the opening of the gate, with the leading edge juxtaposed with one of the opposite abutments and the trailing edge juxtaposed with the other of the opposite abutments;

advancement means for advancing each cap assembly through the gate, the advancement means including coupling means for coupling each cap assembly for movement transverse to the axis through the gate and for rotation about the axis as the cap assembly is advanced transverse to the axis through the gate, with the axis following a path spaced from each of the opposite abutments a distance greater than said first distance and less than said second distance so that as each cap assembly is advanced through the gate, the trailing edge of the cap assembly will engage one of the opposite abutments while the leading edge will clear the other of the opposite abutments and the cap assembly will turn about the axis to be oriented with the trailing edge located behind the leading edge as the cap assembly emerges from the gate; and output means for receiving the cap assemblies serially from the gate in a stream of cap assemblies oriented uniformly with the trailing edges located behind the leading edges for advancement to the bottles in the selected orientation.

2. The apparatus of claim 1 wherein the advancement means includes a rotor mounted for rotation about an axis of rotation transverse to the gate such that the path followed by the axis of each cap assembly as the cap assembly passes through the gate is an arcuate path.

3. The apparatus of claim 2 wherein the cap assemblies each include a pump housing extending longitudinally between the leading edge and the trailing edge, and a dip tube extending altitudinally from the pump housing along the axis of the cap assembly, and the rotor includes a first disk for supporting each cap assembly along the pump housing and a second disk spaced altitudinally from the first disk and having a periphery at the arcuate path, the coupling means including a plurality of pockets spaced along the periphery of the second disk, the pockets being generally complementary to the dip tubes for holding the dip tube of a cap assembly within a corresponding pocket as the cap assembly is advanced through the gate.

4. The apparatus of claim 3 wherein the coupling means includes an arcuate guide bar juxtaposed with the periphery of the second disk adjacent the gate for capturing the dip tube of the cap assembly within a corresponding pocket of the second disk as the cap assembly is advanced through the gate.

5. The apparatus of claim 1 wherein the cap assemblies each include a pump housing extending longitudinally between the leading edge and the trailing edge, and a dip tube extending altitudinally from the pump housing along the axis of the cap assembly, the input means including an input track for placing the cap assemblies along the path of travel with the dip tubes essentially parallel to one another and transverse to the direction of travel of the cap assemblies along the path of travel.

6. The apparatus of claim 5 wherein the advancement means includes a rotor mounted for rotation about an axis of rotation parallel to the axis of each cap assembly such that the path followed by the axis of each cap assembly as the cap assembly passes through the gate is an arcuate path essentially normal to the axis of each cap assembly.

7. The apparatus of claim 6 wherein the rotor includes a first disk for supporting each cap assembly along the pump housing and a second disk spaced altitudinally from the first disk and having a periphery at the arcuate path, the coupling means including a plurality of pockets spaced along the periphery of the second disk, the pockets being generally complementary to the dip tubes for holding the dip tube of a cap assembly within a corresponding pocket as the cap assembly is advanced through the gate.

8. The apparatus of claim 7 wherein the coupling means includes an arcuate guide bar juxtaposed with the periphery of the second disk adjacent the gate for capturing the dip tube of the cap assembly within a corresponding pocket of the second disk as the cap assembly is advanced through the gate.

9. The apparatus of claim 1 wherein the output means includes an output track having an inlet adjacent the gate and an outlet remote from the gate, the inlet having a width corresponding to the opening of the gate and the outlet having a width narrower than the width of the inlet, the output track being tapered between the inlet and the outlet.

10. The apparatus of claim 9 wherein the cap assemblies each include a pump housing extending longitudinally between the leading edge and the trailing edge, the pump housing having a predetermined width, and the width of the outlet is essentially complementary to the width of the pump housing.

* * * * *